United States Patent [19]
Schnabel, Jr. et al.

[11] Patent Number: 5,902,366
[45] Date of Patent: May 11, 1999

[54] GLASS SHEET FORMING METHOD

[75] Inventors: James P. Schnabel, Jr., Maumee; Paul D. Ducat, Perrysburg; Robert L. Boyles, Jr., Toledo, all of Ohio

[73] Assignee: Glasstech, Inc., Perrysburg, Ohio

[21] Appl. No.: 08/872,834

[22] Filed: Jun. 11, 1997

Related U.S. Application Data

[62] Division of application No. 08/400,093, Mar. 7, 1995, Pat. No. 5,669,953.

[51] Int. Cl.⁶ .......................... C03B 23/023; C03B 35/00
[52] U.S. Cl. .................. 65/17.1; 65/106; 65/111; 65/182.2; 65/273
[58] Field of Search ............... 65/106, 107, 111, 65/182.2, 260, 273, 289, 287, 290, 291, 323, 17.1

[56] References Cited

U.S. PATENT DOCUMENTS

| | | | |
|---|---|---|---|
| 4,575,390 | 3/1986 | McMaster | 65/273 |
| 4,578,103 | 3/1986 | Fackelman | 65/182.2 |
| 4,615,724 | 10/1986 | Fackelman | 65/182.2 |
| 4,767,437 | 8/1988 | Lampman et al. | 65/287 |
| 4,775,404 | 10/1988 | Klempner et al. | 65/273 |
| 5,002,599 | 3/1991 | McMaster et al. | 65/182.2 |
| 5,004,491 | 4/1991 | McMaster et al. | 65/287 |
| 5,066,321 | 11/1991 | Kramer et al. | 65/182.2 |
| 5,090,989 | 2/1992 | Adoline | 65/273 |
| 5,096,478 | 3/1992 | Kramer et al. | 65/289 |
| 5,156,664 | 10/1992 | Maltby, Jr. et al. | 65/182.2 |
| 5,393,316 | 2/1995 | Sugiyama et al. | 65/289 |
| 5,403,369 | 4/1995 | McMaster | 65/289 |

*Primary Examiner*—Steven P. Griffin
*Attorney, Agent, or Firm*—Brooks & Kushman P.C.

[57] ABSTRACT

A system (20) and method for forming a glass sheet includes a locating assembly (28) for locating at least one glass sheet below a downwardly facing surface (58) of a topside support device (26) that receives the heated glass sheet from a conveyor (24, 24') in preparation for transfer thereof to an associated mold (33) on a mold shuttle (30). The locating assembly (28) includes a support (82) that is mounted outside of the system housing (22) at factory ambient temperature and has a horizontal arm (84) extending therefrom through the housing into its heated chamber (37) with first and second locators (92) and (94) for locating the suspended glass sheet as well as having a third locator that cooperates with the first and second locators to provide the glass sheet location. The first and second locators (92) and (94) are rotatively driven. In one embodiment designed to form a pair of glass sheets during each forming cycle, a pair of the horizontal arms (84) are used and a pair of the third locators (96) are provided mounted on the downwardly facing surface of the topside support device (26). In another embodiment for processing a single glass sheet during each cycle, the third locator (96) is mounted on another horizontal arm (84a) on which a fourth locator (97) is also mounted. Both air hearth and roll conveyors (24, 24') can be utilized to transfer the glass sheet to the topside support device (26) for the location.

7 Claims, 7 Drawing Sheets

GLASS SHEET FORMING METHOD

This is a divisional of application Ser. No. 08/400,093 filed on Mar. 7, 1995, now U.S. Pat. No. 5,669,953.

TECHNICAL FIELD

This invention relates to a glass sheet forming system and method wherein a heated glass sheet is suspended and accurately located below a downwardly facing surface of a topside support device so as to provide accurate registration with a mold that is moved below the topside support device to receive the glass sheet therefrom for the forming.

BACKGROUND ART

U.S. Pat. Pat. Nos. 4,578,103 Fackelman and 4,615,724 Fackelman disclose glass sheet forming wherein a heated glass sheet is suspended by a topside support device at a downwardly facing surface thereof by providing a vacuum and pressurized air to the surface. This suspension of the heated glass sheet is without any contact between the upper surface of the glass sheet and the downwardly facing surface of the topside support device such that it is possible for the upper glass sheet surface to be painted without marring the paint as would take place with such contact. Fixed stops are disclosed on the downwardly facing surface of the topside support device to provide location of the glass sheet prior to being released by termination of the vacuum so as to drop downwardly onto a mold for the forming. Such fixed stops are not capable of slowly decelerating the glass sheet as it is moved into the proper location for registration with the mold for the forming upon being released from the topside support device by termination of the vacuum supplied to the downwardly facing surface. Both the vacuum and the pressurized air are disclosed as being provided through associated passages defined in a sinter bonded fused silica block that defines the downwardly facing surface and has good resistance to thermal warpage.

U.S. Pat. No. 5,002,599 McMaster et al discloses another topside support device having a high temperature metal plate construction for suspending a heated glass sheet by providing pressurized gas and a vacuum to a downwardly facing surface like the fused silica block type topside support device.

U.S. Pat. Nos. 4,775,404 Klempner et al: and 5,090,989 Adoline disclose mold mounted locators for locating a heated glass sheet on the downwardly facing surface of a topside support device such that termination of the vacuum supplied to the device allows the suspended glass sheet to drop onto the mold for forming.

U.S. Pat. No. 5,066,321 Kramer et al discloses glass sheet locators mounted on a topside support device and having longitudinal and transverse actuators for providing longitudinal and transverse movement that positions the glass sheet on the downwardly facing surface of the device in preparation for being released onto a lower mold for forming.

U.S. Pat. No. 5,096,478 Kramer et al discloses an air hearth conveyor that is inclined downwardly along the direction of conveyance and includes a pair of continuous chains at each side of the conveyor for moving restraining bars that restrain the glass sheet movement under the force of gravity.

DISCLOSURE OF INVENTION

One object of the present invention is to provide a glass sheet forming system having an improved locating assembly for a topside support device.

In carrying out the above object, a glass sheet forming system constructed in accordance with the invention is used in a factory having an ambient temperature and includes a housing defining a heated chamber that is heated above the factory ambient temperature sufficiently to permit glass sheet forming. A conveyor is provided within the heated chamber for horizontally conveying a heated glass sheet to be formed along a direction of conveyance. A topside support device of the forming system is located within the heated chamber and has a downwardly facing surface that is inclined downwardly along the direction of conveyance and has vacuum and pressurized gas supplied thereto to provide upside down suspended floating of the heated glass sheet upon being received from the conveyor. The locating assembly of the glass sheet forming system includes a support that is mounted outside of the housing and is at the factory ambient temperature. This locating assembly includes a horizontal arm mounted by the support and extending through the housing into the heated chamber. First and second locators of the horizontal arm locate the suspended glass sheet below the topside support device in a thermally stable location. A third locator of the locating assembly cooperates with the first and second locators to locate the suspended glass sheet below the topside side support device along and transverse with respect to the direction of conveyance. A mold shuttle of the forming system supports a mold below the located glass sheet suspended by the topside support device to receive the glass sheet therefrom for forming.

The mounting of the horizontal arm that carries the first and second locators on a support at the factory ambient temperature prevents thermal distortions from adversely affecting the positioning of the suspended glass sheet below the topside support device.

In the preferred construction of the glass sheet forming system, at least one of the first and second locators includes a rotary locating member and a rotary drive for rotating the rotary locating member. As disclosed, both the first and second locators each includes a rotary locating member and a rotary drive for rotating its rotary locating member. Furthermore, the first and second locators preferably have a common actuator for their rotary drives, and this actuator for the rotary drives of the first and second locators preferably has a connection for providing mounting thereof on the horizontal arm of the locating assembly at a location outside of the housing.

In the preferred construction, the glass sheet forming system includes a pressurized air supply for moving the rotary locating members of the first and second locators upwardly into proximity with the downwardly facing surface of the topside support device. The rotary locating members of the first and second locators each includes a vertically slidable guide on the horizontal arm and a ball connection thereto. Furthermore, the rotary drive of the first and second locators each includes an actuator and a rack moved by the actuator with respect to the horizontal arm as well as including a spur gear that is located on the associated rotary locating member and meshed with the rack thereof so as to be rotated by the rack movement. The meshed relationship of the spur gears and the racks is maintained during vertical movement of the rotary locating members upwardly and downwardly under the control of the pressurized air supply.

In each of different embodiments disclosed, one of the first and second locators on the horizontal arm is a rotary locator for locating the suspended glass sheet along the direction of conveyance and for moving the suspended glass sheet transverse to the direction of conveyance. The other of the first and second locators is mounted on the horizontal arm to provide location of the suspended glass sheet transverse to the direction of conveyance in cooperation with the one rotary locator and in cooperation with the third locator. The first locator includes a rotary locating member and the second locator includes a locating member with each locating member having a vertically slidable guide on the horizontal arm and a ball connection thereto. A pressurized air supply moves the locating members of the first and second locators upwardly into proximity with the downwardly facing surface of the topside support device. The first locator includes a rotary drive having an actuator and a rack moved by the actuator with respect to the horizontal arm as well as having a spur gear that is located on the rotary locating member thereof and meshed with the rack thereof so as to be rotated by the rack movement. The meshed relationship of the spur gear and the rack of the first locator is maintained during vertical movement of the rotary locating member thereof upwardly and downwardly under the control of the pressurized air supply.

The locating assembly of the glass sheet forming system includes a drive mechanism for moving the horizontal arm on which the first and second locators are mounted along and transverse to the direction of conveyance as the glass sheet is received by the topside support device from the conveyor. This drive mechanism of the locating assembly includes one slideway that extends along the direction of conveyance and another slideway that extends transverse to the direction of conveyance to cooperatively mount the horizontal arm on the support which is at factory ambient temperature outside the heated chamber of the housing. Each slideway includes a drive motor that provides driving thereof such that the horizontal arm and the first and second locators mounted thereon are moved along and transverse to the direction of conveyance as the topside support device receives the glass sheet from the conveyor.

Two different embodiments of the conveyor are disclosed. In one embodiment, the conveyor is an air hearth conveyor that is inclined upwardly along the direction of conveyance and has a pusher including locators that locate the glass sheet on the conveyor. This air hearth embodiment of the conveyor has a downstream end including a crowned section that transfers the glass sheet from the air hearth conveyor to the topside support device as the pusher and locators thereof disengage and thereby release the glass sheet. Another embodiment of the conveyor is disclosed as a roll conveyor having rolls that support the glass sheet and rotate to provide conveyance thereof along the direction of the conveyance until the glass sheet is transferred to the topside support device upon moving out of engagement with the rolls so as to be released therefrom. With both embodiments of the conveyor, the first, second and third locators of the locating assembly confine the glass sheet upon being released from the conveyor for the transfer to the topside support device.

One construction of the glass sheet forming system processes a pair of the glass sheets during each locating and forming cycle and has its locating assembly constructed to include a pair of horizontal arms mounted by the support and extending through the housing into the heated chamber from opposite directions. Each horizontal arm has associated first and second locators and the locating assembly includes a pair of the third locators for respectively cooperating with the first and second locators of the pair of horizontal arms to locate the pair of glass sheets received by the topside support device from the conveyor. In this construction, the pair of glass sheets is conveyed and received by the topside support device with elongated axes thereof extending along the direction of conveyance. Also, a central locator mount of the locating assembly supports the pair of third locators on the downwardly facing surface of the topside support device between the pair of horizontal arms on which the associated first and second locators are mounted. This central locator mount has an adjustable connection that provides adjustable positioning of the pair of third locators on the downwardly facing surface of the topside support device. A positioning assembly positions the central locator mount on the downwardly facing surface of the topside support device with respect to the mold shuttle.

In its preferred construction, the positioning assembly of the locating assembly includes a pair of first positioning members on the central locator mount and a pair of second positioning members on the mold shuttle. The pair of first positioning members on the central locator mount is engaged by the pair of second positioning members on the mold shuttle to position the central locator mount and the pair of third locators mounted thereon to locate the pair of glass sheets below the topside support device upon movement of the mold shuttle below its downwardly facing surface. More specifically, the pair of first positioning members are spaced on the central locator mount along the direction of conveyance at upstream and downstream locations, and the pair of second positioning members are spaced on the mold shuttle along the direction of conveyance at upstream and downstream locations. The first and second positioning members at the upstream locations are located lower than the first and second positioning members at the downstream locations to permit movement of the mold shuttle along the direction of conveyance under and away from the topside support device at its downstream side.

The embodiment of the glass sheet forming system designed to form a pair of glass sheets during each cycle has each third locator provided with an elongated construction extending along the direction of conveyance. Each third locator is made of boron nitride so as to have good lubricity at the elevated temperature involved with glass sheet forming.

In another practice of the invention, the glass sheet forming system processes a single glass sheet during each locating and forming cycle and the glass sheet is conveyed with a longitudinal axis thereof extending transversely to the direction of conveyance. With this construction of the forming system, the locating assembly includes a pair of the horizontal arms mounted by the support and extending through the housing into the heated chamber from opposite directions. One of these horizontal arms has the first and second locators thereon, while the other horizontal arm has the third locator and a fourth locator mounted thereon with all of these locators within the heated chamber below the downwardly facing surface of the topside support device. The first and third locators provide location of the glass sheet below the topside support device along the direction of conveyance, and the first and third locators each includes a rotary locating member and has a drive for rotating the rotary locating member thereof to move the glass sheet transverse with respect to the direction of conveyance. The second and fourth locators cooperate to provide location of the glass sheet transverse to the direction of conveyance.

Another object of the present invention is to provide an improved method for locating a heated glass sheet.

In carrying out the above object, the method for locating a heated glass sheet in accordance with the invention is performed by initially conveying the heated glass sheet horizontally along a direction of conveyance while supported from below within a heated chamber that is at the glass forming temperature. The heated glass sheet is transferred to a downwardly facing surface that is within the heated chamber and inclined downwardly along the direction of conveyance and to which vacuum and pressurized gas are supplied to provide suspended floating of the heated glass sheet below the downwardly facing surface. The suspended glass sheet is located below the downwardly facing surface within the heated chamber by first and second locators at least one of which is rotated about a generally vertical axis and that are mounted by a support at factory ambient temperature and that cooperate with a third locator.

In the preferred practice of the method, the first and second locators are each drivingly rotated about an associated generally vertical axis to locate the glass sheet below the downwardly facing surface. The first and second locators are moved along and transverse to the direction of conveyance to locate the heated glass sheet below the downwardly facing surface.

In one practice of the method, the first, second and third locators as well as a fourth locator are moved along and transversely with respect to the direction of conveyance to locate the heated glass sheet below the downwardly facing surface. More specifically, the first and third locators provide location of the suspended glass sheet along the direction of conveyance and are each drivingly rotated about a generally vertical axis to provide movement thereof transverse to the direction of conveyance, and the second and fourth locators provide location of the glass sheet transversely to the direction of conveyance.

The objects, features and advantages of the present invention are readily apparent from the following detailed description of the best modes for carrying out the invention when taken in connection with the accompanying drawings.

BEST MODES FOR CARRYING OUT THE INVENTION

Figure 1:
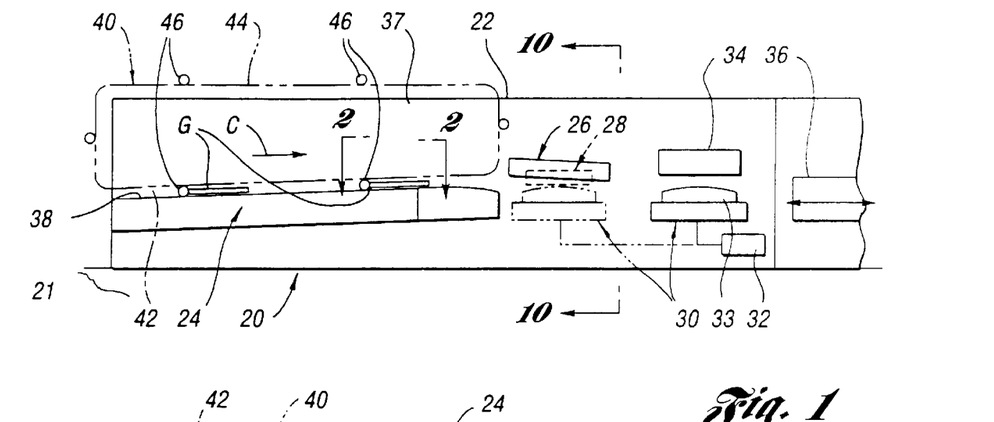
FIG. 1 is a side elevational view in schematic format illustrating a glass sheet forming system constructed in accordance with the present invention.

With reference to FIG. 1 of the drawings, a glass sheet forming system constructed in accordance with the invention is indicated generally by 20 and will be described in an integrated manner with the glass sheet locating method of the invention. This glass sheet forming system 20 is located within a factory on the floor 21 thereof and includes a housing 22, a conveyor 24, a topside support device 26, a locating assembly 28 for locating a heated glass sheet for upside down suspended floating on the topside support device 26, and a mold shuttle 30 that is movable between the solid and phantom lines indicated positions by a suitable actuator 32 such that one or more molds 33 thereon receives a heated glass sheet from the topside support device 26 for forming as is hereinafter more fully described. Either ring type or full surface type molds may be utilized and, in the latter case, a vacuum may be provided to the mold surface to form the heated glass sheet to the shape of its surface. As disclosed, the system also includes another mold 34 to which the shuttle 30 moves the glass for a pressing operation such as disclosed by U.S. Pat. No. 5,004,491 McMaster et al. After such pressing, the formed glass sheet is supported by a vacuum on the mold 34 as the shuttle 30 moves back to the topside transfer device 26 for the next cycle and as a delivery mold 36 is moved from the right toward the left to receive the glass sheet from mold 34 prior to movement back to the right for cooling of the glass sheet.

With continuing reference to FIG. 1, the housing 22 of the system is insulated in a conventional manner and defines a heated chamber 37 that is heated above the factory ambient temperature sufficiently to permit glass sheet forming. This heating can be performed in any conventional manner such as by electric resistance heating or by gas burners.

Figure 2:
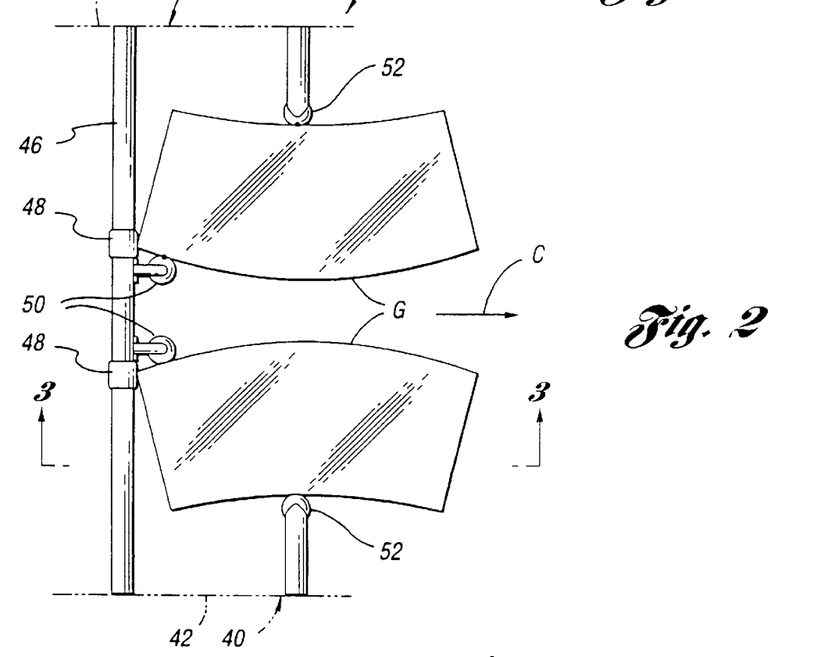
FIG. 2 is a top plan view taken along the direction of line 2—2 in FIG. 1 to illustrate the manner in which a pair of glass sheets to be formed are conveyed within a heated chamber defined by the system housing along a conveyor which is of the air hearth type.
Figure 3:
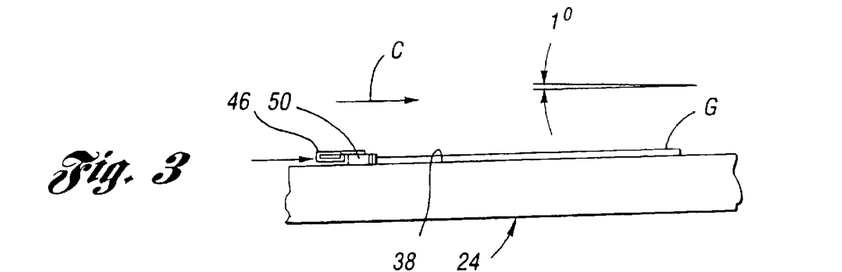
FIG. 3 is a side elevational view taken along the direction of line 3—3 in FIG. 2 to further illustrate the conveyance.

The conveyor 24 is located within the heated chamber 37 defined by housing 22 as shown in FIG. 1 and is constructed to provide horizontal conveyance of a heated glass sheet to be formed along a direction of conveyance illustrated by arrow C. The specific conveyor 24 illustrated is of the well known air hearth type having an upwardly facing surface 38 to which pressurized gas is supplied to float the glass sheet G to be formed. More specifically, the system 22 is constructed similar to the system disclosed in U.S. Pat. No. 5,096,478 Kramer et al wherein a pair of endless conveying loops 40 are respectively located at each lateral side of the housing 22 and have lower conveyor reaches 42 that move along the direction of conveyance shown by arrow C as well as having upper return reaches 44 that move in the opposite direction as the conveyance. Pushers embodied by bars 46 extend between the conveying loops 40 and support pusher members 48 as well as locators 50 as shown in FIG. 2 wherein the conveyance is illustrated with a pair of glass sheets to be formed during each forming cycle as is hereinafter more fully described. In addition, conveying loops 40 also respectively support a pair of locators 52 for locating the pair of glass sheets G. Air hearth conveyor 24 as illustrated in FIG. 3 is inclined upwardly along the direction of conveyance shown by arrow C with the inclination being as illustrated at approximately 1° such that there is a rise of about one unit for each sixty units of horizontal conveyance. During the conveyance, each pusher member 48 exerts a couple on the associated glass sheet G so as to maintain engagement thereof with the associated inboard upstream locator 50 and the associated outboard downstream locator 52.

Figure 4:
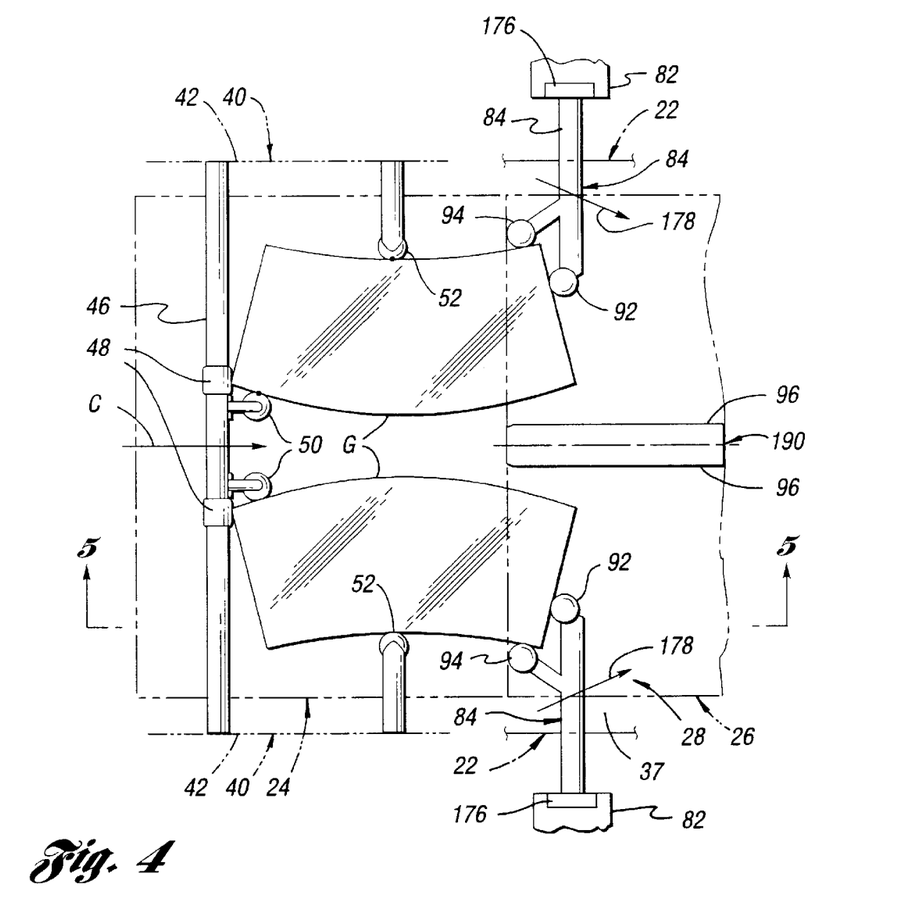
FIG. 4 is top plan view taken in the same direction as FIG. 2 and illustrates the manner in which the glass sheets are transferred from the conveyor to a topside support device for upside down suspended floating as well as illustrating a locating assembly that locates the glass sheets.
Figure 5:
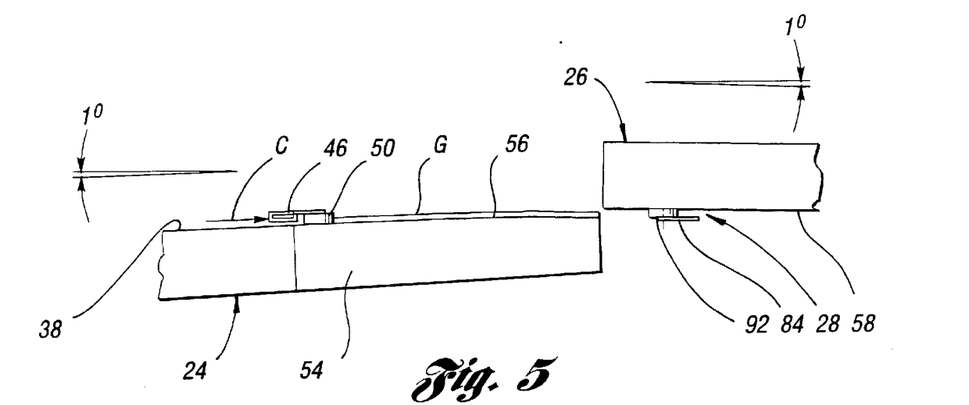
FIG. 5 is a side elevational view taken along the direction of line 5—5 in FIG. 4 to further illustrate the manner in which the glass sheets are transferred to and located below the topside support device.

As illustrated in FIGS. 4 and 5, each glass sheet G is transferred from the air hearth conveyor 24 to the topside support device 26 in preparation for the forming. At its downstream end, the air hearth conveyor 24 has a crowned section 54 whose upper surface 56 in the preferred embodiment has a radius of curvature of 87.5 feet, i.e. 26.67 meters. However, at its upstream end, the crowned section 54 has a flat portion that is three inches long, i.e. 7.62 centimeters, and coplanar with the upper surface 38 of the air hearth conveyor 24 as well as being tangent with the upstream end of the curved surface 56 so as to facilitate the conveyance of the glass sheet onto the crowned section. Likewise, the downstream end of the crowned section 54 has a flat portion that is six inches long, i.e. 15.24 centimeters, and is tangent with the downstream end of the curved surface 56 as well as being parallel with but slightly lower than a downwardly facing surface 58 of the topside support device 26 as is hereinafter more fully described. This crowned section 54 is forty-two inches long such that its uppermost intermediate portion along the direction of conveyance is about ⅛ inch, i.e. 0.3175 centimeters, higher than its upstream and downstream ends where the curvature begins and ends at the adjacent flat portions. With this construction, gravity acts on each glass sheet to exert a force thereon into engagement with the associated pusher member 48 until the center of gravity of the glass sheet is conveyed past the uppermost portion of the surface 56, whereupon gravity then exerts a force on the glass sheet away from the pusher member 48 toward the topside support device 26 for transfer thereto as hereinafter more fully described.

Figure 7:
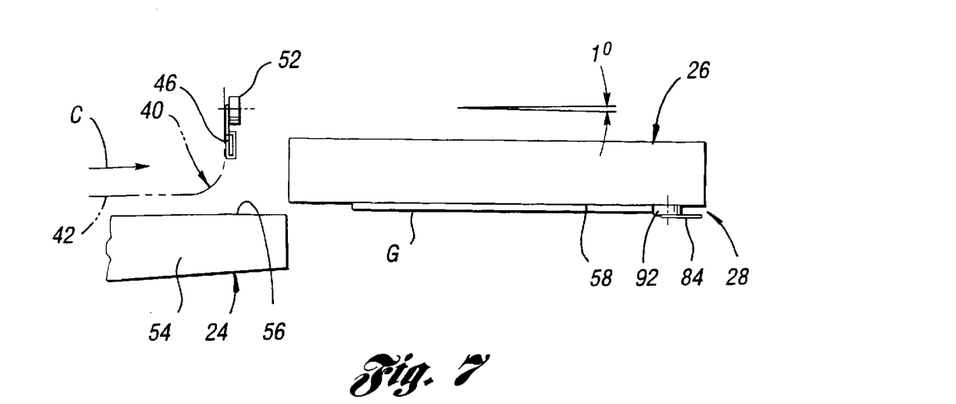
FIG. 7 is a side elevational view taken along the direction of line 7—7 in FIG. 6 to further illustrate the manner in which the glass sheets are transferred to and located below the topside support device.
Figures 13, 14, 15:
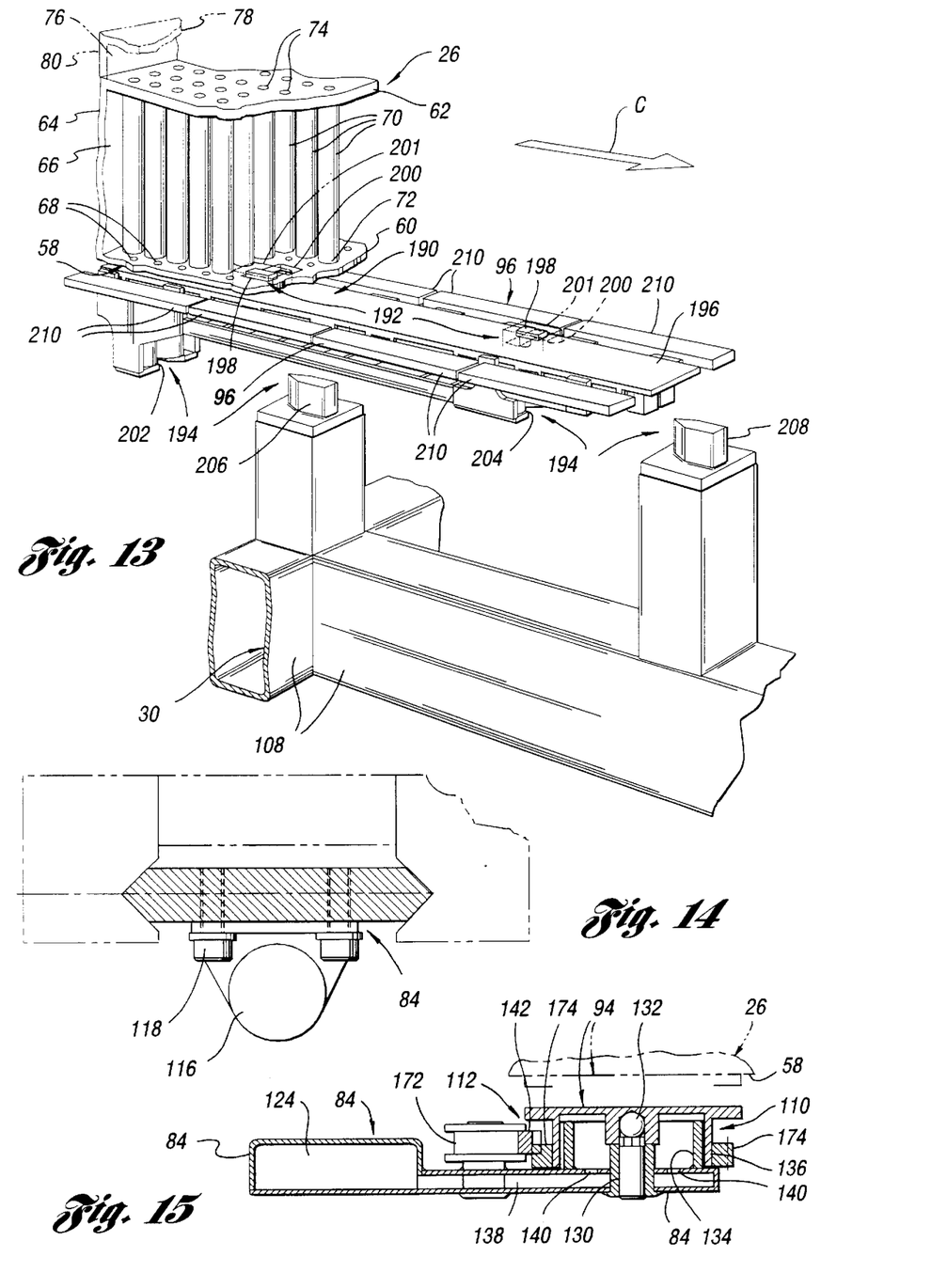
FIG. 13 is a broken away perspective view illustrating the manner in which a positioning assembly of the forming system positions a center locator on the topside support device with respect to a mold shuttle.
FIG. 14 is a sectional view taken along the direction of line 14—14 in FIG. 12 to illustrate a slideway construction of the horizontal arm of the locating assembly.
FIG. 15 is a sectional view taken along the direction of line 15—15 in FIG. 11 to illustrate the manner in which locators on the horizontal arm are moved vertically and rotatively driven.

As illustrated in FIGS. 5 and 7, the topside support device 26 has its downwardly facing surface 58 provided with a downward inclination along the direction of conveyance with this inclination being 1° as illustrated, i.e. the same extent as the upward inclination of the air hearth conveyor previously described but in an opposite direction. While this topside support device 26 may be constructed from fused silica as disclosed by U.S. Pat. Nos. 4,578,103 Fackelman and 4,615,724 Fackelman, the specific topside support device utilized as illustrated best in FIG. 13 is constructed from metal plates as disclosed by U.S. Pat. No. 5,002,599 McMaster et al. More specifically with continuing reference to FIG. 13, a lower metal plate 60 and an upper metal plate 62 cooperate with metal side plates 64 to define a plenum 66 to which pressurized gas is supplied for flow downwardly through a first set of holes 68 to the downwardly facing surface 58 defined by plate 60. Holes 68 can be provided with short tubes as disclosed by the previously mentioned U.S. Pat. No. 5,002,599 McMaster et al patent to facilitate the flow of pressurized gas from the plenum 66 to the downwardly facing surface 58. Tubes 70 within the plenum extend between the lower and the upper plates 60 and 62 and have lower ends that define a second set of holes 72 in the lower plate surface 58 dispersed with the first set of holes 68 over the extent of the topside support device. These tubes 70 have upper ends that are communicated through holes 74 in the upper plate 62 with a vacuum chamber 76 cooperatively defined by the upper plate 62, a further upper plate 78, and side plates 80. Thus, both pressure and a vacuum are provided to the downwardly facing surface 58 of the plate 60 so as to provide upside down suspended flow of each heated glass sheet G upon being received by the topside support device 26 from the conveyor 24.

Figure 6:
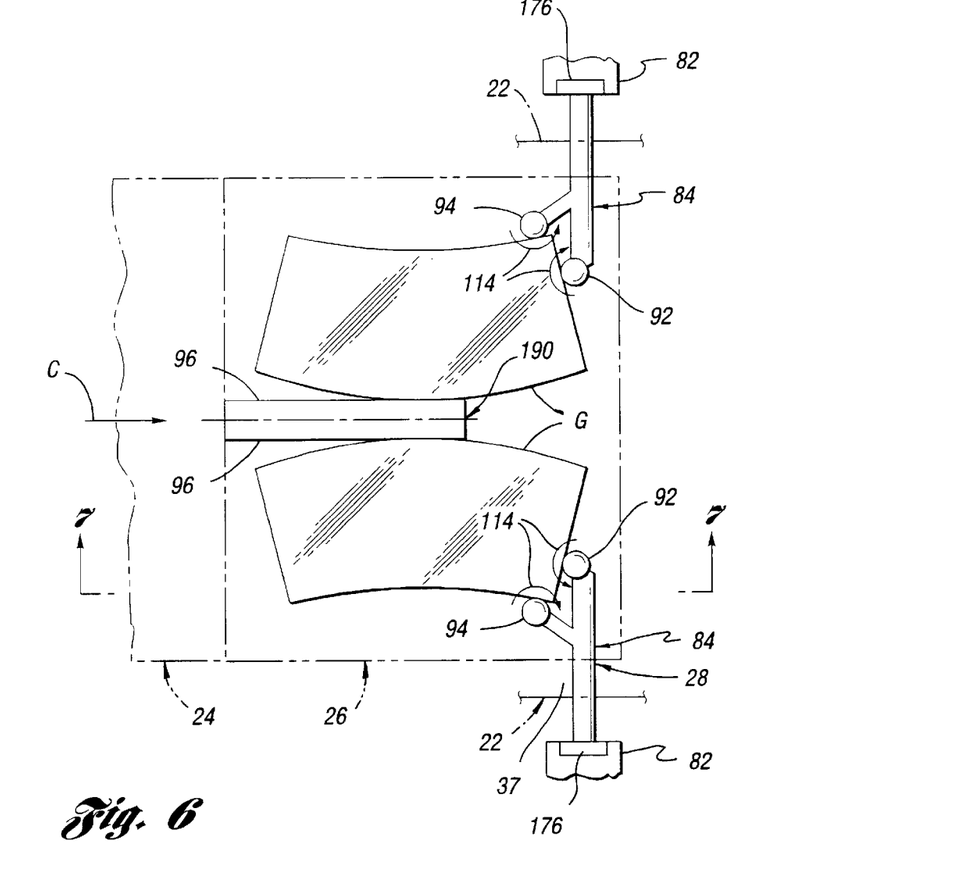
FIG. 6 is a top plan view taken in the same direction as FIGS. 2 and 4 to illustrate the glass sheets after final location thereof by the locating assembly of the system.
Figure 10:
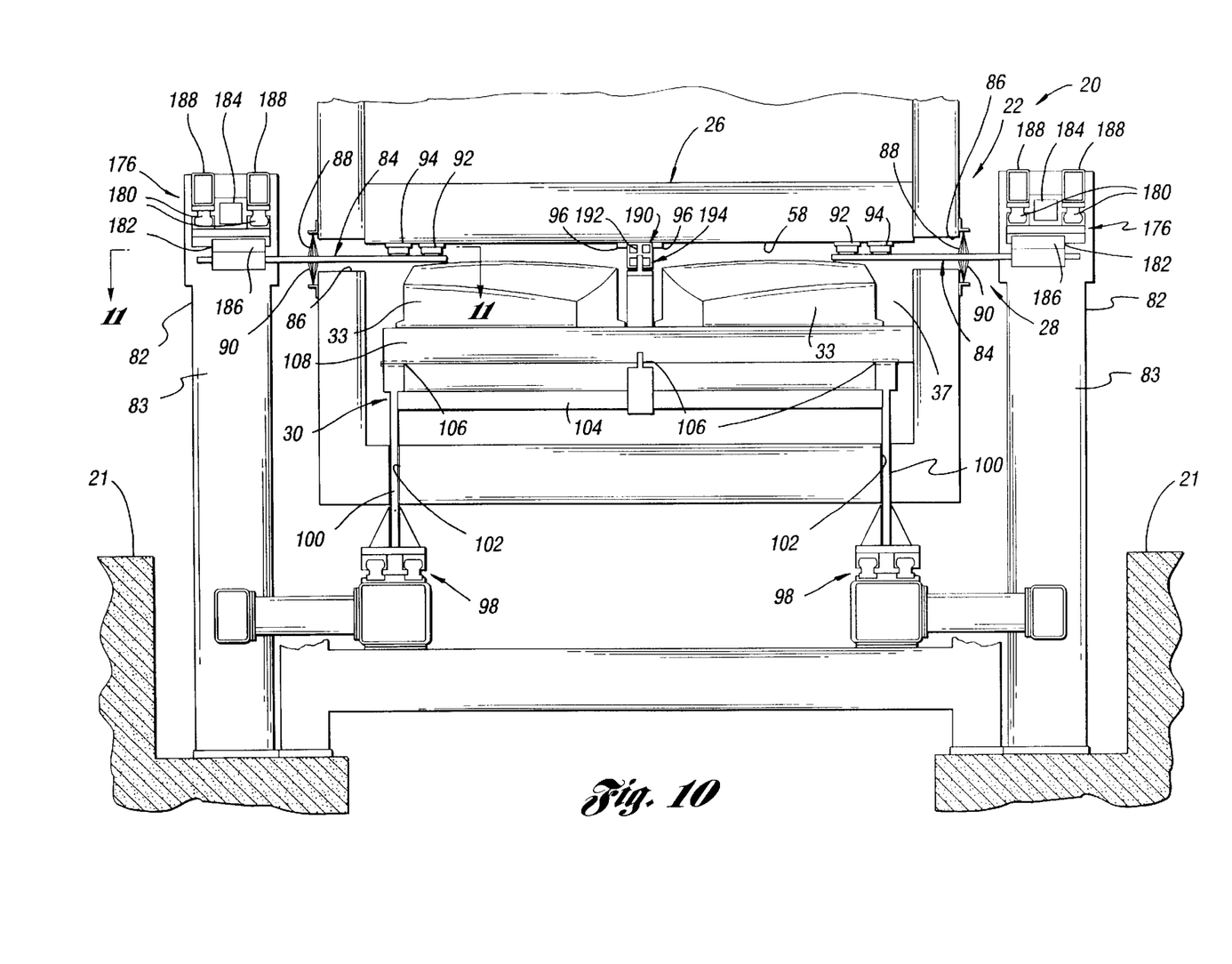
FIG. 10 is a cross-sectional view taken through the forming system along the direction of line 10—10 in FIG. 1 to illustrate the construction of the forming system housing, topside support device, locating assembly, and mold shuttle.

As illustrated in FIGS. 4, 6 and 10, the locating assembly 28 includes a support 82 that is mounted outside of the housing 22 and is thus at the factory ambient temperature rather than the elevated temperature necessary to provide forming of glass sheets. As such, this support 82 is not subjected to thermal warpage as is the housing 22 and is thus capable of providing a fixed location from where the location takes place. As shown in FIG. 10, the support 82 is embodied by a pair of vertical posts 83 that extend upwardly from the factory floor 21 on opposite sides of the system housing 22. Furthermore, the embodiment illustrated processes a pair of glass sheets for locating and forming thereof during each cycle and the locating assembly 28 includes a pair of horizontal arms 84 having generally Y-shaped inner ends as well as having outer ends respectively mounted by the pair of posts 83 of the support 82 as is hereinafter more fully described. Each horizontal arm 84 extends through the housing 22 into its heated chamber 37 at a location just below the topside support device 26 as best illustrated in FIG. 10. These horizontal arms 84 extend into the housing 22 from opposite directions through slots 86 between housing mounted upper and lower wire brushes 88 and 90 that reduce heat loss while permitting movement of the horizontal arms as is hereinafter described. A suitable framework not illustrated in FIG. 10 supports the insulated housing 22 both above and below the side slots 86 at locations spaced upstream and downstream from the location illustrated.

As illustrated in FIGS. 4 and 6, each horizontal arm 84 has first and second locators 92 and 94 on its Y-shaped inner end for locating the associated suspended glass sheet G below the topside support device 26 in a thermally stable location. Furthermore, a third locator 96 of the locating assembly cooperates with each set of the first and second locators 92 and 94 to locate the associated suspended glass sheet G below the topside support device 26 along and transverse with respect to the direction of conveyance shown by arrow C.

Mold shuttle 30 moves as shown in FIG. 1 between the solid and phantom line indicated positions to receive a heated glass sheet from the topside support device 26 upon a reduction or complete termination of the vacuum supplied thereto as previously described. Proper location of the glass sheet below the topside support device along with accurate positioning of each mold thus insures proper registration of the glass sheet for the desired forming. The mold shuttle 30 as shown in FIG. 10 is supported by slideways 98 that are located outside of the housing 22 and are thus at the factory ambient temperature like the support 82. More specifically, the shuttle 30 is constructed in the manner disclosed by U.S. Pat. No. 5, 230,728 McMaster with legs 100 extending upwardly through slots 102 in the floor of the housing 22. These slots 102 extend along the direction of conveyance so as to permit the shuttle movement as described above under the control of its actuator. Shuttle 30 includes a subframe 104 supported by the legs 100 within the heated chamber 37 of the housing 22. Slot and guide connection 106 as disclosed by the aforementioned U.S. Pat. No. 5,230,728 McMaster support a mold frame 108 of the shuttle with a thermally stable reference location. Thus, each mold 33 mounted by the mold frame 108 is accurately located on the shuttle 30. As the mold 33 receives the glass sheet from the topside support device 26 upon reduction or complete termination of its vacuum, the accurate location of the glass sheet by the locating assembly 28 thus provides accurate registration with respect to the mold 33 to insure forming to the desired shape.

Figure 11:
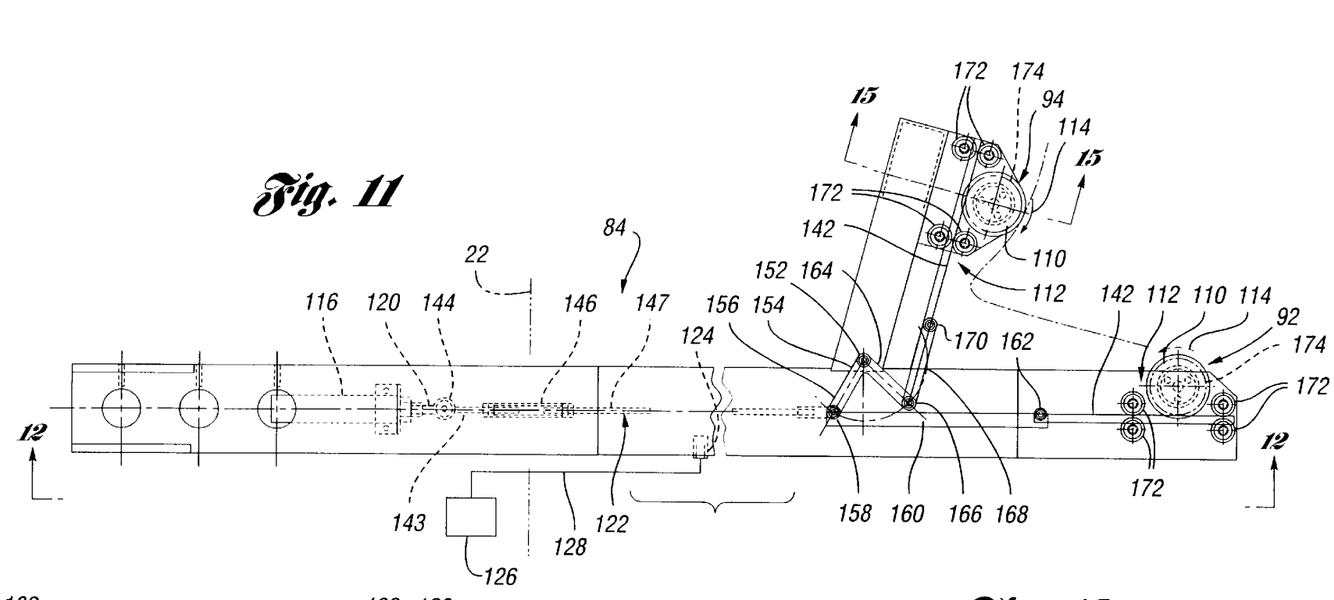
FIG. 11 is a top plan view taken along the direction of line 11—11 in FIG. 10 to illustrate a horizontal arm of the locating assembly of the forming system.
Figure 12:
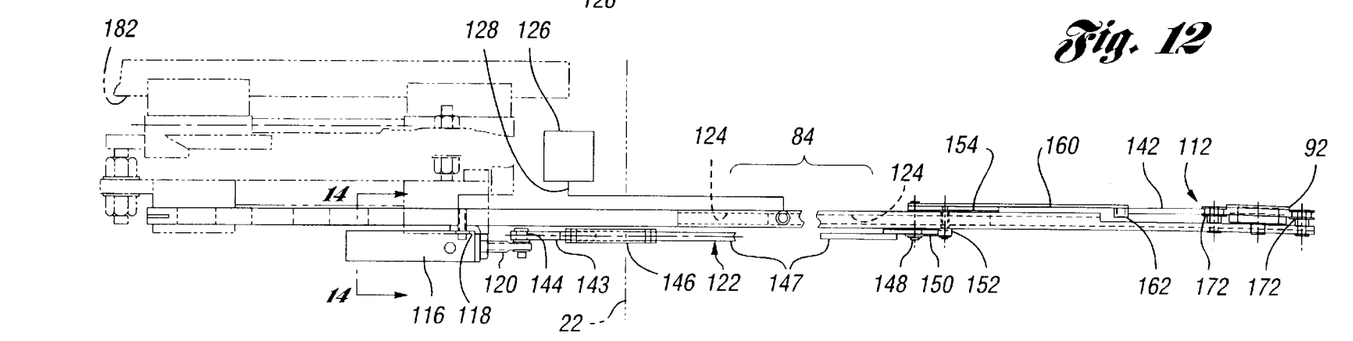
FIG. 12 is an elevational view taken along the direction of line 12—12 in FIG. 11 to further illustrate the construction of the horizontal arm of the locating assembly.

As best illustrated in FIGS. 11, 12 and 15, at least one and, as illustrated, preferably both of the first and second locators 92 and 94 on each horizontal arm 84 each includes a rotary locating member 110 and a rotary drive 112 for providing driving rotation thereof about an associated generally vertical axis in the directions shown by curved arrows 114. The locators 92 and 94 each engage the adjacent glass sheet edge such that the locator rotation moves the glass sheet toward the other locator to insure proper positioning thereof in cooperation with the third locator 96. Furthermore, the first and second locators 92 and 94 preferably have a common actuator 116 shown in FIGS. 11 and 12 for their rotary drives 112. This actuator 116 has a connection 118 embodied by a bracket and bolt as illustrated in FIG. 12 for providing mounting thereof on the horizontal arm 84 of the locating assembly 28 at a location outside of the housing 22. More specifically, the connection 118 mounts the actuator 116 on the lower side of the horizontal arm 84 as illustrated. This actuator 116 is constructed as a cylinder whose piston connecting rod 120 is moved back and forth by compressed air supplied to the opposite sides of the piston within the cylinder of the actuator. A connecting linkage 122 extends between the actuator rod 120 and the rotary drives 112 of the locators 92 and 94 to provide actuation thereof as is hereinafter more fully described.

As illustrated in FIGS. 11, 12 and 15, the horizontal arm 84 has a hollow interior 124 through which pressurized air is supplied from a source 126 via a flexible conduit 128. This pressurized air is supplied to the rotary locating members 110 of each locator to provide upward movement thereof as illustrated in FIG. 15 into proximity with the downwardly facing surface 58 of the topside support device so as to insure engagement thereof with the edge of the glass sheet to be located. The flow of the air through the horizontal arm 84 provides preheating thereof prior to reaching the locators and thereby reduces cooling of the locators which function best at the glass forming temperature. Also, further preheating of the pressurized air can be done by first passing it through a tube, such as a serpentine shaped tube mounted on the horizontal arm at its lower side, before the introduction into the interior of the horizontal arm for the flow to the rotary locating members.

With continuing reference to FIG. 15, each of the rotary locating members 110 of the first and second locators such as illustrated by the second locator 94 shown includes a vertically slidable guide 130 on the horizontal arm and has a ball connection 132 thereto so as to permit upward and downward guided movement as well as any necessary angular movement of the locating member so as to insure close proximity positioning thereof with respect to the surface 58. The horizontal arm 84 has an annular ring 134 mounted thereon and received within an annular skirt 136 of the rotary locating member 110. This ring 134 and the skirt 136 cooperate in a telescoping relationship to permit the upward and downward movement of the rotary locating member 110 under the impetus of the pressurized air supplied from the arm interior 124 through a passage 138 and holes 140 into the interior of the ring 134.

With combined reference to FIGS. 11 and 12, the rotary drives 112 of the first and second locators 92 and 94 each includes an actuator that, as described above, is preferably embodied by the common actuator 116 in cooperation with the linkage 122 and each also includes a toothed rack 142 that is moved by the actuator in cooperation with the linkage with respect to the horizontal arm 84. More specifically, the linkage 122 has a link 143 with a pivotal connection 144 to the piston connecting rod 120 of the cylinder type actuator 116. A threaded length adjustor 146 of the linkage 122 is connected to the link 143 and to a link 147 to provide adjustment of the length of the linkage 122 in providing the connection between actuator 116 and the racks 142. Link 147 extends from the adjuster 146 and has a connection 148 as shown in FIG. 12 to a pivotal link 150 with a pivotal connection 152 providing support thereof below the horizontal arm 84. The pivotal connection 152 also extends upwardly through the horizontal arm 84 to a V-shaped link 154 that is supported as shown in FIG. 11 above the horizontal arm 84 and pivoted under the impetus of the linkage 122 by the actuator 116. One arm 156 of the V-shaped link 154 has a connection 158 to another link 160 which has a pivotal connection 162 to the toothed rack 142 associated with the first locator 92. A second arm 164 of the V-shaped link 154 has a connection 166 to one end of a link 168 whose other end has a pivotal connection 170 to the toothed rack 142 that is associated with the second locator 94. Rotatable guides 172 are mounted on the horizontal arm 84 in cooperable pairs as best illustrated in FIG. 11 with the toothed racks 142 movably supported therebetween adjacent the first and second locators 92 and 94. As illustrated in FIG. 15, each rotary locating member 110 has a spur gear 174 that is mounted on the skirt 136 thereof and meshed with the toothed rack 142. This meshed relationship of the spur gear 174 with the associated toothed rack 172 is maintained during vertical movement of the rotary locating member 110 of the associated locator upwardly and downwardly between the solid and phantom line indicated positions under the control of the pressurized air supplied as previously described.

While the rack and spur gear/linkage actuated construction for rotating the locators is preferred, other types of rotary actuation can also be used such as, for example, actuation by a wire that is wound around the locator and has ends that extend outwardly such that they can be pulled to provide the rotation, etc.

As illustrated in FIGS. 4, 10 and 12, the locating assembly 28 includes a drive mechanism 176 for moving each horizontal arm 84 on which the first and second locators 92 and 94 are mounted along and transverse to the direction of conveyance as illustrated by each arrow 178 in FIG. 4. This movement of the horizontal arm 84 and the first and second locators 92 and 94 thereon takes place as the associated glass sheet G is received by the topside support device 26 from the conveyor 24. The speed of movement of the horizontal arm 84 along the direction of conveyance is about equal to the glass sheet speed on the conveyor such that there is a relative slow approach speed and hence gentle initial engagement between the locators and the glass sheet G under the force of gravity as previously described.

As best illustrated in FIGS. 10 and 11, the drive mechanism 176 of the locating assembly 28 associated with each horizontal arm 84 includes one slideway 180 that extends along the direction of glass sheet conveyance and also includes another slideway 182 that extends transverse to the direction of glass sheet conveyance such that the slideways cooperatively mount the associated horizontal arm on the support 82 which is at factory ambient temperature. The one slideway 180 includes a drive motor 184 (FIG. 10) that provides driving thereof along the direction of glass sheet conveyance, while the other slideway 182 includes a drive motor 186 that provides driving transverse to the direction of conveyance. More specifically, the drive mechanism 176 is suspended below a pair of longitudinally extending beams 188 on the upper end of the associated support post 83, with the one upper slideway 180 directly suspended from these beams and with the other lower slideway 182 suspended from the upper slideway. Operation of the drive motors 184 and 186 thus provides movement of the associated horizontal arm 84 both along and transverse to the direction of conveyance in a manner that allows the glass sheet G being received by the topside support device to be confined by the locators thereof as is hereinafter more fully described.

As previously described in connection with FIGS. 1–7, the embodiment of the conveyor 24 illustrated is an air hearth conveyor that is inclined upwardly along the direction of conveyance and has a pusher embodied by the pusher members 48 of the pusher bar 46 as well as the locators 50 and 52 that cooperate with the pusher members to located each glass sheet as it is moved along the conveyor 24 for transfer to the topside support device. As also previously mentioned, the air hearth conveyor 24 has a downstream end including a crowned section 54 as shown in FIG. 5 for transferring the glass sheet from the air hearth conveyor to the topside support device as the pusher and locators of the conveyor disengage and thereby release the glass sheet as its center of gravity moves over the uppermost portion of the upper surface 56 of this crowned section as previously described.

Figure 8:
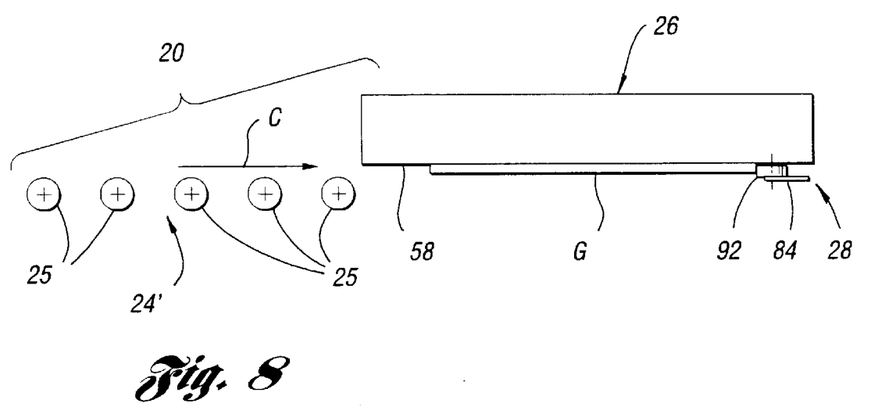
FIG. 8 is a side elevational view similar to FIG. 7 but illustrating another construction wherein the conveyor is a roll conveyor as opposed to an air hearth type as illustrated in FIGS. 1–7.

With reference to FIG. 8, the forming system 20 is herein illustrated with another embodiment of the conveyor 24' that is constructed as a roll conveyor having rolls 25 that support the glass sheet and rotate to provide conveyance thereof along the direction of conveyance shown by arrow C until the glass sheet is transferred to the topside support device 26 upon moving out of engagement with the roll so as to be released therefrom by such disengagement. This roll conveyor 24' has its end adjacent the topside support device 26 provided with the rolls 25 located so the glass sheet is conveyed with a slight downward inclination along the direction of conveyance. This downward inclination is of the same extent as the downward inclination of the surface 58 so as to thereby facilitate the transfer of the glass sheet from the roll conveyor 24' to the topside support device 26.

Regardless of whether the conveyor is of the air hearth type as shown in FIGS. 1–7 or of the roll type as shown in FIG. 8, the first, second and third locators 92, 94 and 96 confine the associated glass sheet upon being released by the conveyor for the transfer to the topside support device so that the glass sheet cannot move out of position.

With reference to FIGS. 4, 6 and 10, the glass sheet forming system as illustrated in this embodiment and as was previously mentioned is constructed to convey and transfer a pair of glass sheets G to the topside support device 26 for forming at the same time as each other upon respectively being received by the pair of molds 33 on the mold shuttle 30. Furthermore, the pair of horizontal arms 84 are mounted by the support 82 on opposite sides of the system housing 22 as best shown in FIG. 10 and extend through the housing into the heated chamber 37 as previously described such that the associated first and second locators 92 and 94 thereon are located below the downwardly facing surface 58 of the topside support device 26 as previously described to provide glass sheet location. Furthermore, the locating assembly 28 as also previously described includes a pair of the third locators 96 for respectively cooperating with the first and second locators 92 and 94 of the pair of horizontal arm 84 to locate the pair of glass sheets received by the topside support device 26 from the conveyor whether it is of the air hearth or roll type as previously described.

With combined reference to FIG. 6, 10 and 13, the glass sheet forming system is illustrated as including a central locator mount 190 that supports the pair of third locators 96 on the downwardly facing surface 58 of the topside support device 26 between the pair of horizontal arms 84 on which the associated first and second locators 92 and 94 are mounted as previously described. More specifically, the central locator mount 190 has an adjustable connection 192 (FIG. 13) that provides adjustable positioning of the pair of third locators 96 on the downwardly facing surface 58 of the topside support device. Furthermore, a positioning assembly 194 positions the central locator mount 190 on the downwardly facing surface 58 of the topside support device 26 with respect to the mold shuttle 30 and, more specifically, with respect to each mold of the shuttle.

The adjustable connection 192 of the central locator mount 190 includes an elongated plate 196 that extends longitudinally with respect to the direction of glass sheet conveyance along arrow C with the third locators 96 mounted on its opposite sides. The upper side of the plate 196 supports a pair of keys 198 at upstream and downstream positions. Each key 198 has an enlarged head spaced above elongated plate 196. The lower metal plate 60 of the topside support device 26 includes a pair of L-shaped keyholes 200 whose stems extend transversely with respect to the direction of glass sheet conveyance along the direction of arrow C. Suitable partially illustrated enclosures 201 on the upper side of lower plate 60 isolate the keyholes 200 from the plenum 66 so that pressurized gas therein does not flow therefrom through the keyholes to the downwardly facing surface 58 of the lower plate. The bases of the keyholes 200 are large enough to receive the heads of the keys 198 upon upward movement of the central locator mount with respect to the topside support device 26 whereupon lateral movement thereof transverse to the direction of glass sheet conveyance along arrow C positions the keys within the stems of the keyholes as illustrated. Positioning assembly 194 adjustably positions the central locator mount 190 on the topside support device 26 at the proper transverse location with respect to the mold shuttle 30 and each mold thereon as is hereinafter more fully described.

As illustrated by continuing reference to FIG. 13, the positioning assembly 194 includes a pair of first positioning members 202 and 204 on the central locator mount positioned on the lower side thereof below the upper side where the keys 198 are mounted. Positioning assembly 194 also includes a pair of second positioning members 206 and 208 on the mold frame 108 of the mold shuttle 30. The pair of first positioning members 202 and 204 on the central locator mount 190 are engaged by the pair of second positioning members 206 and 208 on the mold shuttle 30 upon movement of the mold shuttle below the topside support device 26 to position the central locator mount 190 and the pair of third locators 96 mounted on opposite sides thereof so as to thereby locate the glass sheets below the topside support device. This positioning is in a transverse direction with respect to the direction of glass sheet conveyance through the system.

As illustrated, each of the first positioning members 202 and 204 on the central locator mount 190 has a slot-like construction which may include rollers on each side thereof, and each of the pair of second positioning members 206 and 208 on the mold frame 108 of the shuttle 30 has a pointed lug construction so as to be received by the associated slot shaped positioning member on the central locator mount. Of course, it should be appreciated that other constructions of the positioning members are possible and that with the constructions illustrated is it possible to reverse the relative positions of the slot-type and pointed lug-type positioning members on the central locator mount and the mold shuttle.

As also illustrated in FIG. 13, the pair of first positioning members 202 and 204 are spaced on the central locator mount 190 along the direction of conveyance illustrated by arrow C at upstream and downstream locations. Furthermore, the pair of second positioning members 206 and 208 are spaced on the mold shuttle 30 along the direction of conveyance illustrated by arrow C at upstream and downstream locations. The first and second positioning members 202 and 206 at the upstream locations are located lower than the first and second positioning members 204 and 208 at the downstream locations to permit movement of the mold shuttle 30 along the direction of conveyance under and away from the topside support device 26 at its downstream side.

As shown in FIG. 13, each of the third locators has an elongated construction extending along the direction of conveyance and is mounted in a suitable manner on the adjacent side of the central locator mount plate 196. More specifically, each third locator 96 has an elongated construction extending along the direction of conveyance with a plate-like shape and is made of multiple pieces 210 having lateral edges that engage the associated glass sheet G to provide the location. More specifically, each locator piece 210 and hence each third locator 96 is preferably made of boron nitride so as to have good lubricity at elevated temperatures. The boron nitride utilized may be essentially pure boron nitride or may also include some silica so as to have a greater resistance to wear.

Figure 9:
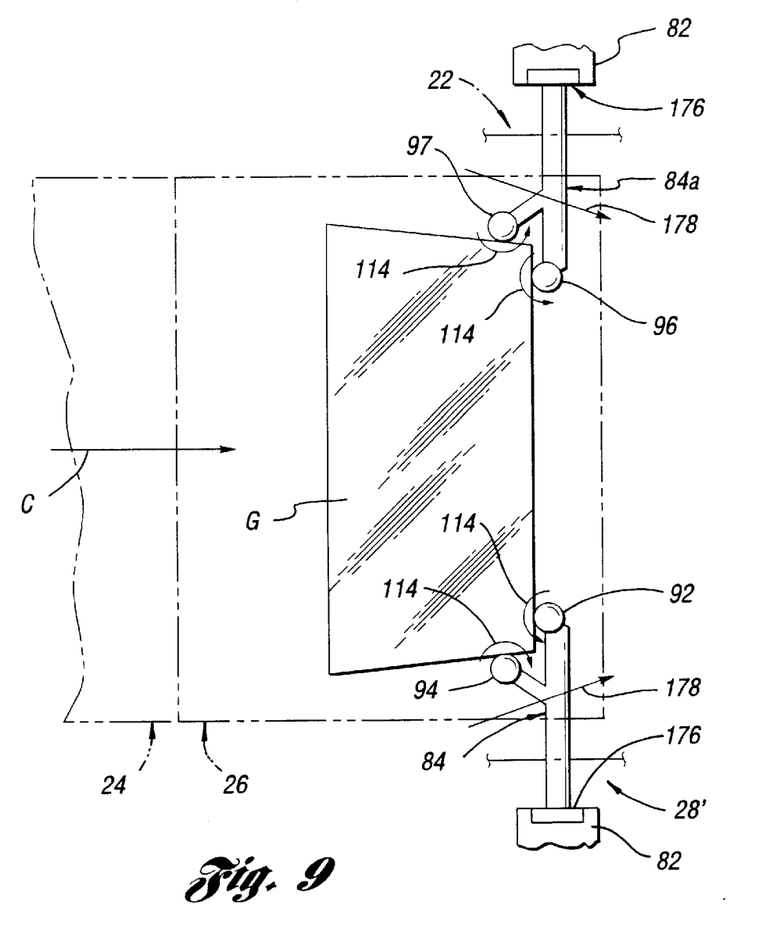
FIG. 9 is a view similar to FIG. 6 illustrating another construction wherein a single glass sheet is located below the topside support device by the locating assembly with its longitudinal axis extending transversely with respect to the direction of conveyance as opposed to along the direction of conveyance as is the case when a pair of the glass sheets are located in the manner illustrated by FIGS. 2–7.

With reference to FIG. 9, the glass sheet forming system 20 as herein illustrated is constructed to convey and locate a single glass sheet G on the topside support device 26 by the locating assembly 28' which has a slightly different construction than the previously described locating assembly. More specifically, this locating assembly includes a pair of the horizontal arms 84 and 84a mounted by the support 82 at the factory ambient temperature and extending through the housing 22 into the heated chamber 37 from opposite directions. One of these horizontal arms 84 has the first and second locators 92 and 94 thereon which are both preferably rotatable in the same manner previously described as illustrated by arrows 114. The other horizontal arm 84a has the third locator 96 and a fourth locator 97. Both the third and fourth locators 96 and 97 are also preferably located generally in the same manner previously described except for the fact that the third locator 96 rotates away from the fourth locator 97 unlike the first and second locators 92 and 94 that both rotate toward each other. Thus, the first and third locators 92 and 96 provide location of the glass sheet G along the direction of conveyance illustrated by arrow C as gravity forces the glass sheet against these locators due to the downward inclination of the downwardly facing surface of the topside support device as previously described. Furthermore, the second and fourth locators 94 and 97 provide location of the glass sheet transverse with respect to the direction of conveyance shown by arrow C. The horizontal arm 84a in addition to providing the location both along and transverse with respect to the direction of glass sheet conveyance by its third locator 96 moves the glass sheet toward the horizontal arm 84 such that upon ultimate positioning there may be a slight spacing of the glass sheet from the locator 97 after full engagement thereof with the second locator 94. Each of the locators 114 of this embodiment are thus drivingly rotated about an associated generally vertical axis.

While the best modes for carrying out the invention have been described in detail, those familiar with the art to which this invention relates will recognize various alternative designs and embodiments for practicing the invention as defined by the following claims.

What is claimed is:

1. A method for locating a heated glass sheet, comprising:

conveying the heated glass sheet horizontally along a direction of conveyance while supported from below within a heated chamber that is at a glass forming temperature;

transferring the heated glass sheet to a downwardly facing surface that is within the heated chamber and inclined downwardly along the direction of conveyance and to which vacuum and pressurized gas are supplied to provide suspended floating of the heated glass sheet below the downwardly facing surface;

engaging the suspended glass sheet below the downwardly facing surface within the heated chamber with first and second locators that are mounted on a support at factory ambient temperature and also engaging the suspended glass sheet with a third locator; and rotatively driving at least one of the first and second locators about a generally vertical axis by a rotary drive including an actuator located externally of the heated chamber whereby the locators cooperate to provide locating of the suspended glass sheet below the downwardly facing surface.

2. A method for locating a heated glass sheet as in claim 1 wherein the first and second locators are drivingly rotated about associated generally vertical axes by the rotary drive to cooperate with the third locator in locating the suspended glass sheet below the downwardly facing surface.

3. A method for locating a heated glass sheet as in claim 1 wherein the first and second locators are moved along and transverse to the direction of conveyance to locate the heated glass sheet below the downwardly facing surface.

4. A method for locating a heated glass sheet as in claim 1 wherein the first, second, and third locators as well as a fourth locator are moved along and transversely with respect to the direction of conveyance to locate the heated glass sheet below the downwardly facing surface.

5. A method for locating a heated glass sheet as in claim 4 wherein the first and third locators provide locating of the glass sheet along the direction of conveyance, wherein the second and fourth locators provide locating of the glass sheet transversely to the direction of conveyance, wherein the first and second locators are drivingly rotated about associated generally vertical axes by the rotary drive, and wherein the third and fourth locators are both drivingly rotated about associated generally vertical axes by a rotary drive including an actuator located externally of the heated chamber.

6. A method for locating a heated glass sheet, comprising:

conveying the heated glass sheet horizontally along a direction of conveyance while supported from below within a heated chamber that is at a glass forming temperature;

transferring the heated glass sheet to a downwardly facing surface that is inclined within the heated chamber downwardly along the direction of conveyance and to which vacuum and pressurized gas are supplied to provide suspended floating of the heated glass sheet below the downwardly facing surface;

engaging the suspended glass sheet below the downwardly facing surface within the heated chamber with first and second locators that are mounted on a support arm at factory ambient temperature and also engaging the suspended glass sheet with a third locator, and the first and second locators being moved by the support arm along and transverse to the direction of conveyance; and rotatively driving the first and second locators about associated generally vertical axes by a rotary drive including an actuator located externally of the heated chamber whereby the first, second and third locators cooperate to provide locating of the suspended glass sheet below the downwardly facing surface.

7. A method for locating a pair of heated glass sheets, comprising:

conveying the pair of heated glass sheets horizontally along a direction of conveyance while supported from below within a heated chamber that is at a glass forming temperature;

transferring the pair of heated glass sheets to a downwardly facing surface that is inclined within the heated chamber downwardly along the direction of conveyance and to which vacuum and pressurized gas are supplied to provide suspended floating of the pair of heated glass sheets below the downwardly facing surface; and respectively engaging the suspended pair of glass sheets below the downwardly facing surface within the heated chamber by a pair of first and second locators that are respectively mounted on a pair of support arms at factory ambient temperature and also respectively engaging the pair of glass sheets with a pair of third locators, and each support arm being moved and moving the associated first and second locators mounted thereon along and transverse to the direction of conveyance; and drivingly rotating the pair of the first and second locators about associated generally vertical axes by a pair of rotary drives that each includes an associated actuator located externally of the heated chamber whereby the locators cooperate to provide locating of the suspended glass sheet below the downwardly facing surface.

* * * * *